Aug. 10, 1926.
R. A. GRIFFITHS
ANIMAL APPAREL
Filed March 2, 1926
1,595,834
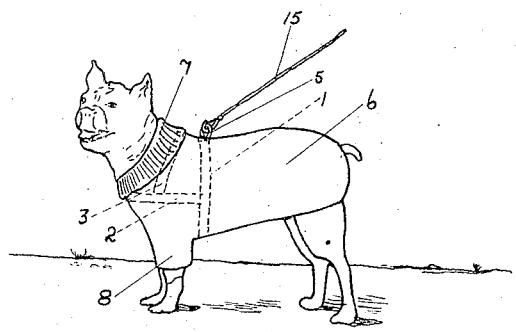
Fig.1.
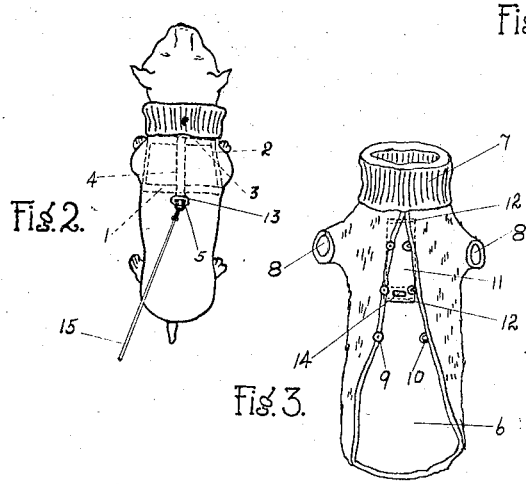
Fig.2.
Fig.3.
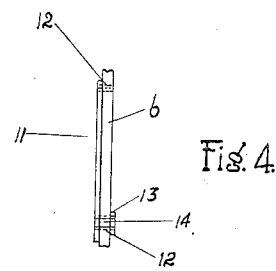
Fig.4.
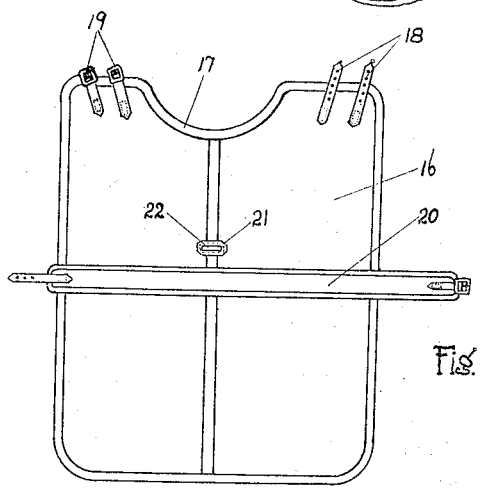
Fig.5.
INVENTOR
ROY A. GRIFFITHS
BY *Philip S. Hopkins*
ATTORNEY Patented Aug. 10, 1926.

1,595,834

UNITED STATES PATENT OFFICE.

ROY A. GRIFFITHS, OF BINGHAMTON, NEW YORK.

ANIMAL APPAREL.

Application filed March 2, 1926. Serial No. 91,774.

My invention relates to apparel or protective coverings for animals, and particularly to dog sweaters and blankets.

As is well known, the usual dog sweater or blanket in common use today is either provided with a ring or other device fastened directly to the garment to receive the leash or lead line, or else it is necessary to place the harness or collar of the animal over the garment. It will be readily understood that the former method, namely of securing the ring to the garment itself provides an inefficient method of leading the animal as the entire strain is placed upon the garment. The latter method necessitates constantly removing and replacing the harness each time the garment is put on the animal and furthermore a harness which fits the animal over the garment is usually too large and loose when worn without the garment.

To overcome these difficulties, I have provided a garment which has for its primary object a means for permitting the securing ring which is usually mounted directly on the harness, to pass through the garment, thus making it possible to lead the animal by the harness and permitting the garment to be slipped on and off the animal without disturbing the harness.

Another object of my invention is to provide a reinforcing means for the garment at the point through which the harness ring passes.

Still another object is to provide such a reinforcing means which will not interfere with the free stretching or shaping of the garment as the same is placed on the animal.

Another object is to provide a garment of the character described which is inexpensive to manufacture and which may be easily slipped on or off the animal without disturbing the usual harness.

Referring now to the drawing, wherein like reference numerals indicate like parts:

Figure 1 is a side view of a dog sweater provided with my invention and illustrating the manner of actual use.

Figure 2 is a top plan view of the same.

Figure 3 is a bottom plan view of the garment itself showing my improved reinforcing means.

Figure 4 is a detail cross sectional view illustrating the flexibility of the reinforcing means.

Figure 5 is a top plan view of my invention applied to a blanket.

Although I have illustrated and will describe my invention as applied to apparel for dogs, it will be understood that the same is equally applicable to apparel for other animals or pets.

The usual dog harness is illustrated in dotted lines in Figures 1 and 2 and comprises the strap 1 encircling the body of the dog, the strap 2 connected at its ends to the strap 1 and passing around across the chest of the dog, and strap 3 connected at its ends to strap 2 and passing up over the dog's neck. The straps 1 and 3 are, as shown in Figure 2, connected at the top by a strap 4 to the rear end of which is secured an upstanding ring 5.

My improved sweater, shown in Figures 1 to 5 inclusive, comprises the body portion 6 provided at one end with the rolled neck piece 7 through which the dog's head projects, and the sleeves 8 for the front legs. Suitable fastening means 9 and 10 may be provided along the edges of the body of the sweater whereby the same may be tightly secured about the dog's body.

Secured to the under surface of the sweater, adjacent the front end thereof, is a loose flexible reinforcing strap 11 sewed or otherwise suitably secured at its ends only to the sweater as at 12. Secured to the outer surface of the sweater at a point directly overlying the rear end of the reinforcing strap 11 is a second reinforcing piece 13 of leather or other suitable heavy material sewed or otherwise secured to the sweater and reinforcing strap 11. An aperture 14 is cut through the reinforcing member 13, sweater 6 and reinforcing strap 11 sufficiently large to permit the ready passage therethrough of the ring 5. This arrangement enables the sweater to be slipped on the dog over the harness and yet permits the dog to be led directly by the harness as by the leash or lead strap 15 snapped through the ring 5. The flexibility of the reinforcing strap 11 and the fact that it is secured to the sweater only at its ends permits the ready stretching and shaping of the sweater as the same is slipped on and off the dog and at the same time provides a very effective reinforcement at this point.

In Figure 5, I have illustrated the application of my invention to a blanket 16 provided with the usual neck piece 17, straps 18 and buckles 19. The body strap 20 with its fastening means is also of the ordinary construction. At a point centrally of the body of the blanket and just back of the neck piece 17, I have provided a reinforcing piece 21 sewed or otherwise suitably secured to the blanket and provided with the opening 22 extending through the piece 21 and the blanket 16 through which may pass the ring 5 of the harness.

It will be observed that my invention is adaptable to other types of animal garments and apparel than those illustrated. Also that many changes in details of form and arrangement may be made without departing from the scope of my invention. I do not limit myself therefore to the exact construction shown other than by the appended claims.

I claim:—

1. A garment for animals comprising a body portion provided with an aperture therein for receiving a harness ring, and a reinforcing strip for said aperture secured at its ends only to said body portion.

2. A garment for animals comprising a body portion provided with an aperture therein for receiving a harness ring, a heavy reinforcing piece for said aperture on the outer side of said body, and a flexible reinforcing strip for said aperture on the underside of said body, said strip being secured at its ends only.

ROY A. GRIFFITHS.